US012750375B1

(12) United States Patent
Frame

(10) Patent No.: US 12,750,375 B1
(45) Date of Patent: Sep. 29, 2026

(54) ATTRIBUTE-BASED PEER GROUP ANALYSIS FOR ACCESS ANOMALY DETECTION

(71) Applicant: Circle Internet Group, Inc., New York, NY (US)

(72) Inventor: John Frame, New York, NY (US)

(73) Assignee: Circle Internet Group, Inc., New York, NY (US)

( * ) Notice: Subject to any disclaimer, the term of this patent is extended or adjusted under 35 U.S.C. 154(b) by 0 days.

(21) Appl. No.: 19/631,281

(22) Filed: Mar. 27, 2026

(51) Int. Cl.
*H04L 9/40* (2022.01)

(52) U.S. Cl.
CPC ........ *H04L 63/104* (2013.01); *H04L 63/1425* (2013.01)

(58) Field of Classification Search
CPC .......................... H04L 63/104; H04L 63/1425
See application file for complete search history.

(56) References Cited

U.S. PATENT DOCUMENTS 7,739,082 B2 * 6/2010 Scherrer ............. H04L 63/1425 703/2
10,009,363 B2 * 6/2018 Modani ............... G06F 16/9024
10,200,393 B2 * 2/2019 Modani ............... G06F 16/9024
2017/0359361 A1 * 12/2017 Modani ............... H04L 63/1416
2018/0278640 A1 * 9/2018 Modani ............... G06F 16/9024

* cited by examiner

*Primary Examiner* — Mohammed Waliullah
(74) *Attorney, Agent, or Firm* — Fish & Richardson P.C.

(57) ABSTRACT

Implementations of the present disclosure are directed to anomaly detection in IAM systems of enterprise landscapes by receiving group data representing a set of groups, each group being associated with an access privilege of a set of access privileges, for each group in the set of groups, assigning an ownership value to the group based on a set of percentage representations, outputting a group ownership data structure providing, for each group in the set of groups, a respective ownership value, processing the group ownership data structure to identify any user in the set of users that has at least one misaligned access privilege relative to the one or more components, and remediating the at least one misaligned access privilege.

20 Claims, 3 Drawing Sheets

ATTRIBUTE-BASED PEER GROUP ANALYSIS FOR ACCESS ANOMALY DETECTION

CROSS-REFERENCE TO RELATED APPLICATIONS

This application claims the benefit of and priority to U.S. Prov. App. No. 64/009,264, filed on Mar. 18, 2026, the disclosure of which is expressly incorporated herein by reference.

TECHNICAL FIELD

This specification relates generally to identity and access management (IAM) systems and more particularly to attribute-based peer group analysis for access anomaly detection in IAM systems.

BACKGROUND

Identity and access management (IAM) systems are a foundational component of enterprise information technology (IT) infrastructure. IAM systems manage digital identities for employees, contractors, partners, and other users, and control how those identities interact with enterprise applications, data repositories, computing resources, and the like. At a high level, IAM systems authenticate users and authorize user access to data, systems, and the like, based on assigned credentials, roles, policies, and/or group memberships. IAM systems integrate with directories, application platforms, and security services in order to ensure that users are able to access the resources necessary to perform their job functions, while preventing unauthorized access to sensitive systems or data.

In modern enterprises, IAM systems can manage thousands, tens of thousands, millions, and upwards, of access entitlements across a heterogeneous environment that can include on-premise systems, cloud applications, databases, infrastructure platforms, and combinations of such. Access rights are commonly granted through role-based access control (RBAC), attribute-based policies, group memberships, or direct entitlement assignments. While these mechanisms enable organizations to manage access at scale, they also introduce increasing complexity as the number of systems, identities, and entitlements grows. Over time, this complexity can expose limitations in traditional approaches to IAM, particularly when attempting to maintain accurate, least-privilege access in large and rapidly evolving organizations.

SUMMARY

This specification describes systems, methods, devices, and other techniques relating to identity and access management (IAM) systems. More particularly, implementations of the present disclosure are directed to attribute-based peer group analysis for access anomaly detection in IAM systems.

In general, innovative aspects of the subject matter described in this specification can include actions of receiving group data representing a set of groups, each group being associated with an access privilege of a set of access privileges to one or more components of the enterprise landscape, for each group in the set of groups, determining a sub-set of users of a set of users associated with the group, users in the set of users each having access privileges to at least one component of the one or more components, for each user in the sub-set of users, determining an attribute value of a set of attribute values for an attribute, for each attribute value in the set of attribute values, determining a percentage of representation within the group to provide a set of percentage representations, and assigning an ownership value to the group based on the set of percentage representations, outputting a group ownership data structure providing, for each group in the set of groups, a respective ownership value, processing the group ownership data structure to identify any user in the set of users that has at least one misaligned access privilege relative to the one or more components, and remediating the at least one misaligned access privilege. Other implementations of this aspect include corresponding systems, apparatus, and computer programs, configured to perform the actions of the methods, encoded on computer storage devices.

These and other implementations can each optionally include one or more of the following features: processing the group ownership data structure to identify any user in the set of users that has at least one misaligned access privilege relative to the one or more components includes, for a group in the set of groups, for each user associated with the group, comparing a respective attribute value of the user to a respective ownership value of the group to provide a comparison, and selectively determining an access privilege misalignment of the user based on the comparison; the access privilege misalignment is determined in response to the respective attribute value of the user being different from the respective ownership value of the group; processing the group ownership data structure to identify any user in the set of users that has at least one misaligned access privilege relative to the one or more components comprises excluding at least one group from the set of groups; the at least one group is excluded using one of a pattern-based exclusion and an explicit exclusion list; at least one group is associated with an ownership value equal to no majority and, in response, is excluded from processing the group ownership data structure to identify any user in the set of users that has at least one misaligned access privilege relative to the one or more components; and remediating the at least one misaligned access privilege comprises removing an access privilege of a user within the IAM system.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
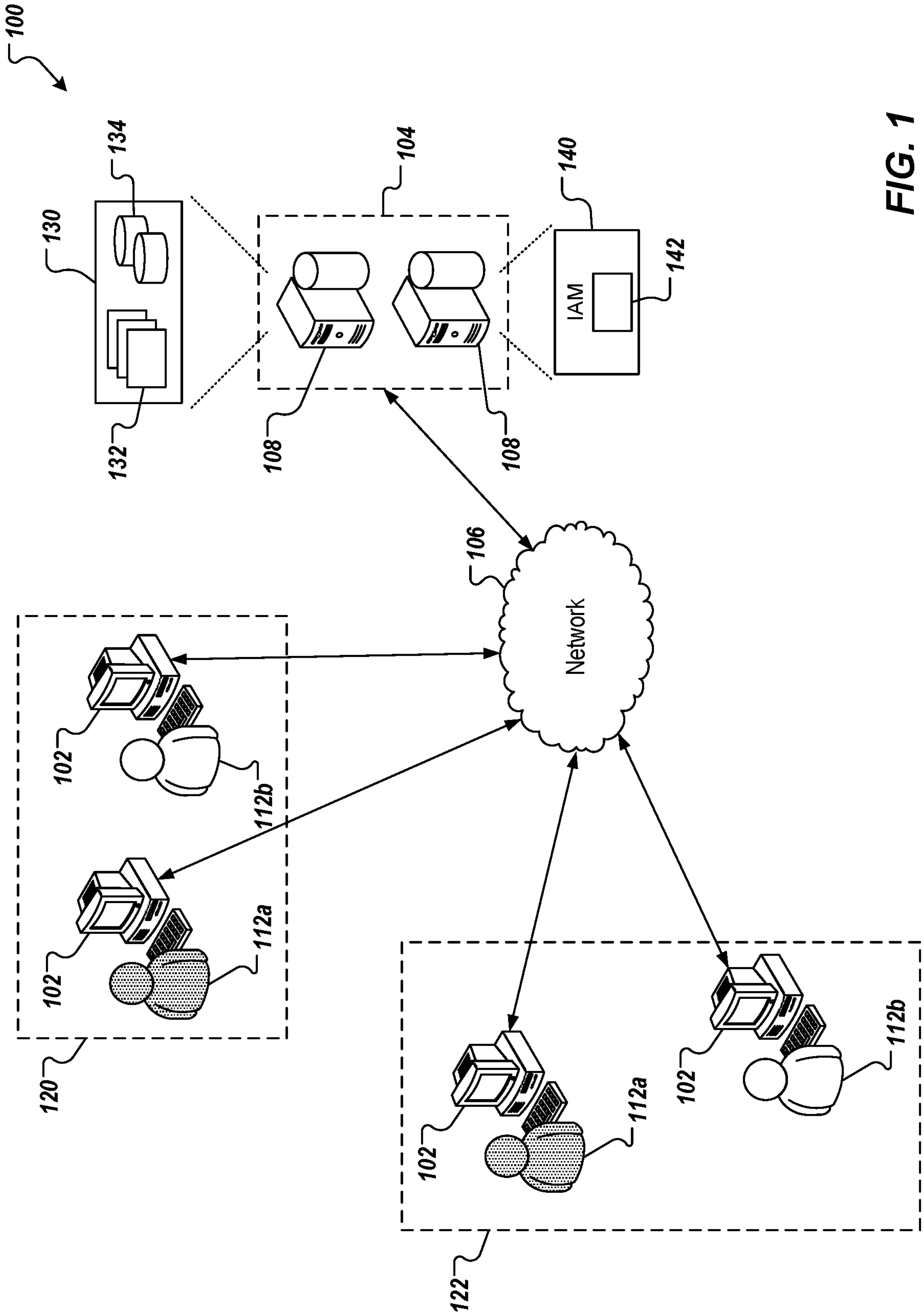
FIG. 1 depicts an example architecture that can be used to execute implementations of the present disclosure.

The technology of this patent application is directed to identity and access management (IAM) systems. More particularly, implementations of the present disclosure are directed to attribute-based peer group analysis for access anomaly detection in IAM systems.

In some implementations, actions include receiving group data representing a set of groups, each group being associated with an access privilege of a set of access privileges to one or more components of the enterprise landscape, for each group in the set of groups, determining a sub-set of users of a set of users associated with the group, users in the set of users each having access privileges to at least one component of the one or more components, for each user in the sub-set of users, determining an attribute value of a set of attribute values for an attribute, for each attribute value in the set of attribute values, determining a percentage of representation within the group to provide a set of percentage representations, and assigning an ownership value to the group based on the set of percentage representations, outputting a group ownership data structure providing, for each group in the set of groups, a respective ownership value, processing the group ownership data structure to identify any user in the set of users that has at least one misaligned access privilege relative to the one or more components, and remediating the at least one misaligned access privilege.

To provide context for the subject matter of the present disclosure, and as introduced above, IAM systems can be tasked with managing thousands, tens of thousands, millions, and upwards, of access entitlements across a heterogeneous environment that can include on-premise systems, cloud applications, databases, infrastructure platforms, and combinations of such. Access rights are commonly granted through role-based access control (RBAC), attribute-based policies, group memberships, or direct entitlement assignments. While these mechanisms enable organizations to manage access at scale, they also introduce increasing complexity as the number of systems, identities, and entitlements grows. Over time, this complexity can expose limitations in traditional approaches to IAM, particularly when attempting to maintain accurate, least-privilege access in large and rapidly evolving enterprise landscapes.

Traditional approaches to IAM face numerous technical challenges. For example, traditional IAM systems rely heavily on predefined roles, static access policies, and hierarchical entitlement structures to determine which resources a user can access. These mechanisms typically assume that organizational roles are stable and that access requirements can be accurately captured through static role definitions or rule-based policies. In practice, however, enterprise environments are highly dynamic. Employees frequently change positions, participate in temporary projects, or inherit permissions through indirect relationships such as nested group memberships. Static role models struggle to represent these evolving access requirements, often resulting in roles that become overly broad, inconsistent across systems, or misaligned with actual operational needs.

Other technical challenges arise from the difficulty of evaluating access entitlements within a broader contextual framework. For example, traditional IAM systems generally track whether a user has been granted a particular entitlement, but lack mechanisms for determining whether that entitlement is appropriate relative to the user's organizational context or to the access profiles of comparable users. As a result, traditional IAM systems can fail to detect anomalous access assignments, excessive privilege accumulation, or problematic combinations of entitlements across multiple systems. These limitations make it difficult for enterprise to automatically identify access configurations that violate least-privilege principles or segregation-of-duties policies, particularly in complex enterprise environments with large numbers of users, applications, and dynamically changing permissions.

In view of the foregoing, implementations of the present disclosure are directed to attribute-based peer group analysis for access anomaly detection in IAM systems. As described in further detail herein, implementations of the present disclosure determine, for each group in the set of groups, an ownership value based on attribute values of users associated with the respective group, and identify, for each group, any users having an access privilege misalignment by comparing the ownership value of the respective group to attribute values of the respective users. Remediation is performed for any access privilege misalignment that is detected.

FIG. 1 depicts an example architecture 100 in accordance with implementations of the present disclosure. In the depicted example, the example architecture 100 includes client devices 102, a network 106, and a server system 104. The server system 104 includes one or more server devices and databases 108 (e.g., processors, memory). In the depicted example, users 112*a*, 112*b* interact with the client devices 102. In the example of FIG. 1, a set of users 112*a*, 112*b* and respective client devices 102 can be associated with a first group 120 and a set of users 112*a*, 112*b* and respective client devices 102 can be associated with a second group 122. In the context of the present disclosure, each of the first group 120 and the second group 122 represents differing access privileges users of the respective groups have. Also, in the context of the present disclosure, users 112*a* have a different role than users 112*b*, the different roles representing differing access privileges users of the respective roles have.

In some examples, each client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes one or more servers 108. In the example of FIG. 1, the server system 104 is intended to represent various forms of servers including, but not limited to a web server, an application server, a proxy server, a network server, and/or a server pool. In general, server systems accept requests for services and provide such services to any number of client devices (e.g., the client devices 102 over the network 106).

In some implementations, the server system 104 can embody a cloud computing environment, in which a heterogeneous enterprise landscape 130 is hosted. In some examples, the enterprise landscape includes, but is not limited to, application systems 132, database systems 134, and the like, each of which constrains access and/or use of users based on privileges. To this end, the server system 104 can host an IAM system 140 that provides functionality for managing access entitlements of users, such as the users 112*a*, 112*b*, across the enterprise landscape 130. In the example of FIG. 1, the IAM system 140 includes an access anomaly detection sub-system 142 that executes attribute-based peer group analysis for access anomaly detection in accordance with implementations of the present disclosure.

As described in further detail herein, attribute-based peer group analysis for access anomaly detection (e.g., as performed by the access anomaly detection sub-system 142) address access governance challenges, including, but not limited to those described herein, at scale. In some examples, attribute-based peer group analysis for access anomaly detection of the present disclosure can be used with existing identity infrastructures (e.g., Okta Identity Provider provided by Okta, Inc.) and organizational data systems (e.g., Workday HR provided by Workday, Inc.).

In accordance with implementations of the present disclosure, access anomaly detection is performed using an attribute-based ownership analysis that analyzes the distribution of a user attribute (e.g., cost center, department, job level) within each access group, determines which attribute value "owns" each access group based on majority representation, identifies users whose access groups do not align with their attribute value, and provides detailed reports of misaligned access for review and remediation. As described in further detail herein, instead of requiring manual definition of which organizational units should have which access, the access anomaly detection discovers these patterns by analyzing existing access distributions and applying a statistical threshold to determine ownership.

As described in further detail herein, the access anomaly detection of the present disclosure is attribute-agnostic and uses discovery-based ownership, threshold-based determination, pattern-based filtering, and batch processing. With regard to being attribute-agnostic, the access anomaly detection of the present disclosure analyzes any user attribute (organizational, hierarchical, categorical) without modification to the core logic. With regard to discovery-based ownership, the access anomaly detection of the present disclosure automatically determines which attribute values should have access to resources based on current membership patterns. With regard to threshold-based determination, the access anomaly detection of the present disclosure uses configurable statistical thresholds to distinguish clear ownership from shared resources. With regard to pattern-based filtering, the access anomaly detection of the present disclosure intelligently excludes system groups and temporary access from analysis. With regard to batch processing, the access anomaly detection of the present disclosure operates on data exports, enabling use with any identity system without API integration, for example.

Figure 2:
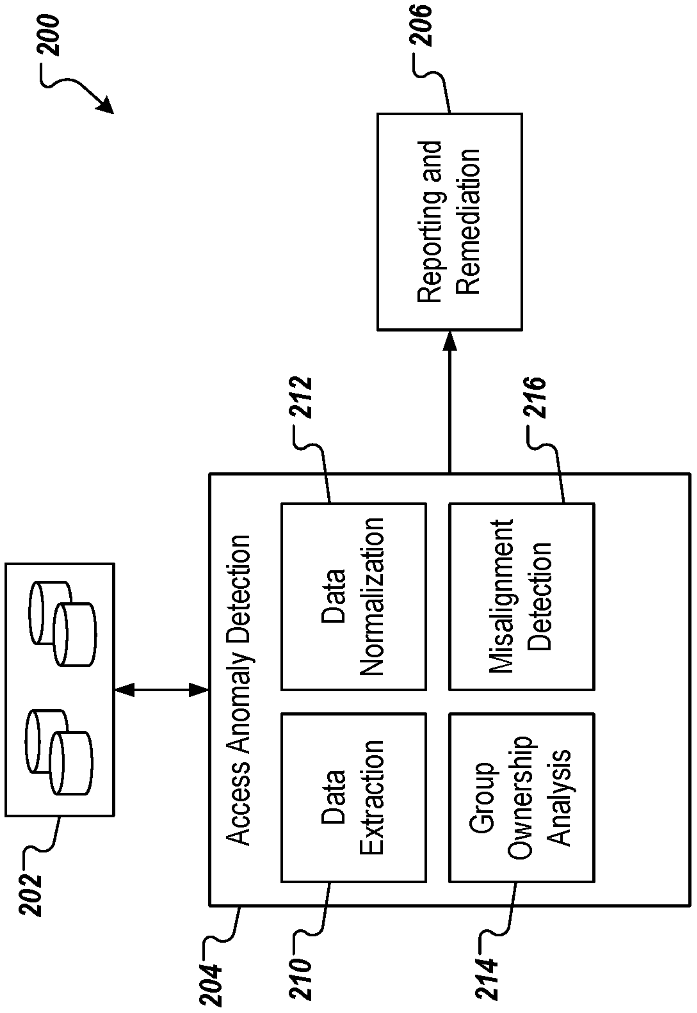
FIG. 2 is an example architecture for access anomaly detection in identity and access management (IAM) systems in accordance with implementations of the present disclosure.

FIG. 2 is an example architecture 200 for access anomaly detection in IAM systems in accordance with implementations of the present disclosure. In the example of FIG. 2, the example architecture 200 includes system data sources 202 (e.g., Okta Identity Provider, Workday HR), an access anomaly detection system 204 (e.g., the access anomaly detection sub-system 142 of FIG. 1), and a reporting and remediation system 206. In some examples, the reporting and remediation system 206 reviews misalignments with context of the enterprise, approves legitimate exceptions, remediates inappropriate access, and feeds results back to exclusion lists.

In the example of FIG. 2, the access anomaly detection system 204 includes a data extraction module 210, a data normalization module 212, a group ownership analysis module 214, and a misalignment detection module 216. In some examples, the data extraction module 210 retrieves data from the system data sources 202, example data including, but not limited to, event logs (e.g., syslog, audit logs), user directories (with attributes of each user), and group membership data. In some examples, the data normalization module 212 (e.g., cleanData.py) extracts user-group membership events, normalize timestamps to dates, validates data completeness, and outputs user group membership data (e.g., user_group_memberships.csv). In some examples, the group ownership analysis module 214 (e.g., groupOwners.py) aggregates users by selected attribute within each group, calculates representation percentage per attribute value, applies majority threshold to determine ownership, marks groups without clear majority as "no majority," and outputs group ownership data (e.g., group_ownership.csv). In some examples, the misalignment detection module 216 (e.g., outlier.py) loads a user attributes and group ownership mapping, applies exclusion filters (patterns and explicit lists), identifies users in groups not owned by their attribute value, generates a detailed misalignment report, and outputs misaligned group entitlements data (e.g., misaligned_group_entitlements.csv).

In further detail, data is extracted from data sources (e.g., the data extraction module 210 of FIG. 2 extracts data from the system data sources 202) and the data is normalized for consistency (e.g., by the data normalization module 212). In some examples, normalization includes adjusting the timestamp format of data from the respective data sources for consistency. For example, membership records are extracted from identity system event logs and are normalized to provide the following example data structure (e.g., stored in a file user_group_memberships.csv):

```
UserGroupMembership {
  date: Date (YYYY-MM-DD)
  user id: String
  user name: String
  group id: String
  group_name: String
}
```

As another example, a user directory is exported from the IAM system and is normalized to provide user attribute records in the following example data structure (e.g., stored in a file users.csv):

```
UserAttribute {
  user id: String
  attribute value: String (e.g., cost_center)
  . . . (other attributes available but not used in current
analysis)
}
```

In accordance with implementations of the present disclosure, group ownership determination (e.g., performed by the group ownership analysis module 214 of FIG. 2) determines which attribute value (e.g., which cost center) can be assigned as owning each access group based on membership distribution. In some examples, data that is input for group ownership determination includes group membership data ({group_id, group_name, user id}) and user attribute data ({user_id, attribute_value}) (e.g., cost center). In some examples, a majority threshold is provided and can be a configurable value (e.g., a configurable percentage having a default, such as 0.30).

In some examples, group ownership determination includes merging data, aggregating by attribute, calculating representation, and determining ownership. In some examples, merging data includes combining group membership with user attributes. For example, for each group G, and for each member user U in G, the attribute value A for the member user U is retrieved. In some examples, aggregating by attribute includes counting member users per attribute value within each group. For example, for each group G, a number of users per attribute value are counted with the result being an attribute value count (e.g., {attribute_value: count}) per group. In some examples, calculating representation includes determining percentage representation. For example, for each (group G, attribute value A), a total members value (total members) is set to the total member users in G, an attribute members value (attribute members) is set equal to member users in G with attribute value A, and the percentage representation is determined as a ratio of attribute members to total members (e.g., attribute members/ total_members).

In some examples, determining ownership includes applying the majority threshold to assign ownership. For example, for each group G, the attribute value with the highest percentage is determined. If the highest percentage is greater than or equal to the majority threshold (e.g., >0.30), an owner value (owner) is set to the attribute value. If the highest percentage is not greater than or equal to the majority threshold, the owner value is set to no majority.

In some examples, a mathematical representation can be provided. For example, for access group G with member set $M(G)=\{u_1, u_2, \ldots, u_n\}$, the attribute value for user u is provided as Attr(u). In some examples, the attribute representation is provided as $R(A,G)=|\{u \in M(G)|Attr(u)=A\}|/|M(G)|$. In some examples, ownership assignment is provided as Owner(G)=A, where $R(A, G)=\max\{R(A', G)$ for all $A'\}$ AND $R(A, G)\geq\tau$, where r is the majority threshold (e.g., default=0.30). As discussed above, if no A satisfies $R(A, G)\geq r$, then Owner(G)="no majority". In some examples, the output of determining ownership is a mapping {group_id, group_name, owner_attribute_value}.

In some examples, a group ownership record is generated (e.g., calculated by groupOwners.py and stored in a file group_ownership.csv) with the following example data structure:

```
GroupOwnership {
  group id: String
  group name: String
  owner_attribute_value: String (or "no majority")
}
```

In some implementations, misalignment detection is performed to identify users whose access does not align with the ownership patterns of their attribute value. In some examples, data that is input for misalignment detection includes user-group memberships({date, user_id, user_name, group_id, group name}), user attributes ({user id, attribute value}), group ownership ({group_id, group_name, owner_attribute_value}), exclusion lists (e.g., groups and patterns to ignore), and filter patterns (e.g., naming patterns indicating system groups). An exclusion list can include a group exclusion provided in the following example data structure (e.g., stored in a file group_exclusions.csv):

```
GroupExclusion {
  group id: String
}
```

In some examples, misalignment detection includes joining data, applying exclusions, and identifying misalignments. In some examples, joining data includes merging user memberships with attributes and ownership. For example, for each membership (user U, group G) the attribute value of the user (User_Attr) is retrieved and the owner attribute value of the group (Group_owner) is retrieved. In some examples, exclusions are applied to filter out groups that are not relevant for analysis. This can be performed to remove groups where, for example, a group is in an explicit exclusion list, a group name matches an exclusion pattern (e.g., JIT:*, MDM*, Zscaler ZIA*, RBAC*, discussed in further detail herein), a group owner is "no majority," and/or a group is missing critical data.

In some examples, a misalignment record is generated (e.g., calculated by outlier.py and stored in a file misaligned_group_entitlements.csv) with the following example data structure:

```
AccessMisalignment {
  date: Date
  user id: String
  user name: String
  user attribute value: String
  group id: String
  group name: String
  owner_attribute_value: String
}
```

Continuing, to identify misalignments, attribute value mismatch is detected. For example, for each (user U, group G) that remains after filtering, if User_Attr≠Group_Owner, a flag is set indicating misalignment. The results are organized for review by sorting and reporting. In some examples, misalignments are sorted by date (temporal ordering) and group ID (grouping same-group misalignments). This can be represented as, for example, for user u with attribute value A(u) and access set Access(u):

Expected Access: $E(u)=\{G|Owner(G)=A(u)\}$

Actual Access: Access(u)={all groups where u is member}

Misaligned Access: $M(u)=\{G\ E\ Access(u)|Owner(G)\neq A(u)$ AND $Owner(G)\neq$"no majority" AND $G\notin$Exclusions}

Following, the output can include a detailed report that includes:

- Date of membership event
- User ID and name
- User's attribute value
- Group ID and name
- Group's owner attribute value Implementations of the present disclosure are described in further detail herein with reference to an example implementation. It is contemplated, however, that implementations of the present disclosure can be realized using any appropriate implementations.

In the example implementations, for attribute selection, the access anomaly detection system is configured to analyze a cost_center attribute (e.g., from the profile.costCenter field in the user directory). As noted above, the access anomaly detection system is attribute-agnostic, such that the attribute being analyzed is effectively a configuration parameter. Accordingly, any appropriate attribute (e.g., any categorical or hierarchical organizational attribute) can be used, for example:

- Cost center
- Department
- Division
- Job level/grade
- Job title
- Physical location
- Manager ID
- Legal entity
- In some examples, to change which attribute is analyzed, the column reference in the code from profile.costcenter can be changed to the desired attribute field name.

The following example attribute requirements can be provided:

- Must be present in the Okta user directory export
- Should be categorical (discrete values, not continuous)
- Should have meaningful organizational significance
- Should be consistently populated across Circle's user population As discussed above, a majority threshold is used and is a percentage of group members required to establish ownership. As also discussed above, a default value of 0.30 can be used, which means that, if 30% or more of a group's members share the same attribute value, that attribute value is considered the "owner" of the group. The majority threshold can be selected to balance sensitivity (detecting misalignments) with specificity (avoiding false positives for legitimately shared resources). In some examples, the default value can be empirically determined based on an organizational structure of the enterprise and typical access sharing patterns. The majority threshold can be adjusted using a command-line parameter:

bash python groupOwners.py—threshold 0.40

With regard to the majority threshold, there are multiple considerations. For example, a lower threshold (e.g., 0.20) results in more groups being assigned ownership, more misalignments being detected, and potentially more false positives. A higher threshold (e.g., 0.50) results in fewer groups being assigned ownership, only clear majorities being detected, and fewer false positives, but likely missing subtle access violations. In general, the majority threshold should reflect the typical access sharing patterns of the enterprise.

As also discussed above, one or more exclusion mechanisms can be used to focus the analysis on relevant access privileges. In some examples, pattern-based exclusions and explicit exclusion list(s) can be considered.

With regard to pattern-based exclusions, specific group naming patterns can be identified to automatically exclude one or more groups based on organizational knowledge. For example:

- Just-In-Time (JIT) Access: 'JIT:*:granted'
  - Temporary elevated access grants to a JIT system
  - Expected to be cross-organizational
  - Not indicative of baseline entitlements
- Mobile Device Management (MDM): Groups starting with 'MDM'
  - Device management groups
  - Not business application access
- Network Access (Zscaler): Groups starting with 'Zscaler ZIA'
  - Network infrastructure access groups
  - Managed separately from application access
- Role-Based Access Control (RBAC): Groups starting with 'RBAC'
  - Technical role assignments
  - May span organizational boundaries legitimately With regard to an explicit exclusion list, a file (e.g., group_exclusions.csv) containing specific group IDs to exclude. Example can include, without limitation:

- Universal groups (e.g., "Employees", "Service Accounts", "Contingent")
- Cross-functional teams (e.g., company-wide collaboration groups)
- Shared resources (e.g., "Okta Admins", specific application groups with documented cross-organizational use)
- Groups under review or in transition
- Documented legitimate exceptions identified during prior analysis cycles In some examples, management of exclusion lists can include curation by an internal IAM team based on enterprise knowledge with iterative updates as false positives are identified and validated. In this manner, exclusion lists serve as institutional knowledge capture for access patterns across the enterprise.

As discussed herein, a "no majority" exclusion can be used to account for groups where no single attribute value meets the majority threshold (i.e., are marked as "no majority"). Such groups are excluded from misalignment detection. These can represent, for example, truly shared resources with no clear organizational ownership, cross-functional teams, temporary project groups, and/or groups in transition.

In some implementations, comprehensive data validation is performed to ensure analysis accuracy. Example data validation can include file validation (e.g., verify all required input files exist before processing, check files are not empty or corrupted, validate CSV parsing succeeds), column validation (e.g., verify all required columns are present, check column names match expected schema, ensure no critical columns are entirely empty), data quality checks (e.g., remove records with missing user IDs or group IDs, remove users without attribute values, such as missing cost center, handle and log invalid date formats, remove records with missing group ownership data), and processing validation (e.g., check data remains after each filtering step, warn if filtering removes significant data volume, validate output before writing files, provide summary statistics for audit).

Figure 3:
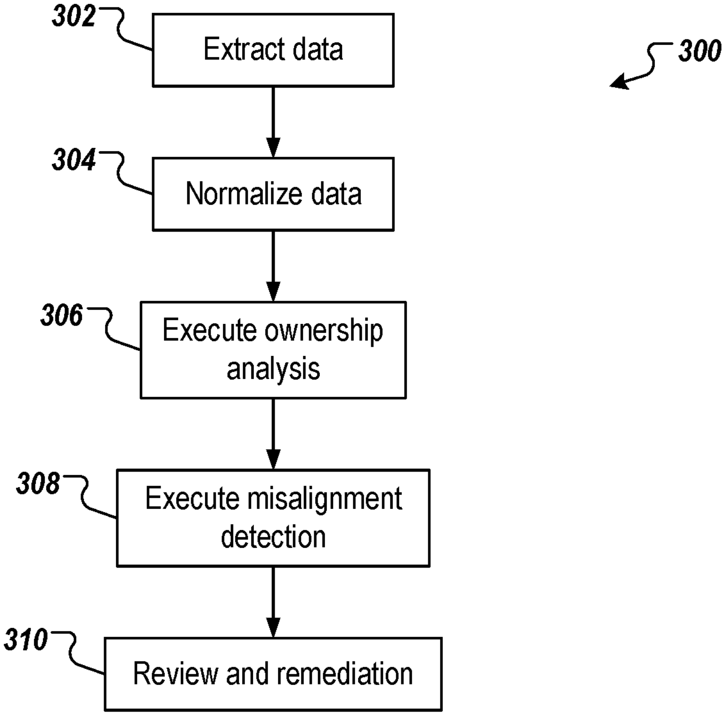
FIG. 3 depicts a flowchart of an example process that can be executed in accordance with implementations of the present disclosure.

FIG. 3 depicts a flowchart of an example process 300 that can be executed in accordance with implementations of the present disclosure. In some examples, the example process 300 is provided using one or more computer-executable programs executed by one or more computing devices.

Data is extracted (302) and is normalized (304). For example, and as described in detail herein, the data extraction module 210 of FIG. 2 extracts data from the system data sources and the data normalization module (212) normalizes the data. In some examples, membership records are extracted from identity system event logs and are normalized and a user directory is exported from the IAM system and is normalized to provide user attribute records. For example, a raw event log (syslog_query.csv) is retrieved from identity system and user-group membership events are extracted, event fields are mapped to a standard schema, timestamps are converted to date format, any records with missing critical fields are removed, and the records are sorted by date and group for consistent reporting. The output is user group memberships recorded in a file (e.g., user_group_memberships.csv).

Ownership analysis is executed (306) and misalignment detection is executed (308). For example, and as described in detail herein, the group ownership analysis module 214 executes ownership analysis and the misalignment detection module 216 executes misalignment detection.

In some examples, group memberships (group_membership.csv), a user directory with attributes (users.csv), and a set of parameters (e.g., majority threshold (0.30) are provided as input. Membership data is merged with user attributes and users are aggregated by attribute value within each group. For each group, a percentage representation is determined and the highest-represented attribute value is identified. For each group, ownership is assigned to the respective highest-represented attribute value, if the majority threshold is met. Otherwise, ownership is assigned to "no majority." The output is each group being assigned a respective ownership (e.g., attribute value, "no majority"), provided as a file (group_ownership.csv).

In some examples, input to misalignment detection includes user-group memberships (user_group_memberships.csv), the user directory (users.csv), the group ownerships (group_ownership.csv) and any group exclusions that are to be applied (group_exclusions.csv). In some examples, the data is merged, users without attribute values are removed, groups without ownership data are removed, any "no majority" groups are excluded, any explicit exclusion list is applied, any pattern-based exclusions are applied, attribute value mismatches are identified, and results are sorted (e.g., temporally). The output is misaligned group entitlements (misaligned_group_entitlements.csv).

Review and remediation are performed (310). For example, and as described herein, the misaligned group entitlements (misaligned_group_entitlements.csv) are input to the review and remediation module 206 of FIG. 2. In some examples, misalignments are reviewed with enterprise context, legitimate exceptions are distinguished from violations, legitimate exceptions are added to group exclusions (group_exclusions.csv), access removal is performed for violations, remediation progress (i.e., removal of accesses) is tracked, and the analysis can be re-executed to verify remediation.

Implementations of the present disclosure are described in further detail herein with respect to example use cases and applications. It is contemplated, however, that implementations of the present disclosure can be realized for any appropriate use cases and applications.

An example can include compliance and audit, such as Sarbanes-Oxley (SOX) compliance. In this example, users with access to financial systems outside their cost center can be determined and potential segregation of duties violations across Treasury, Finance, and Accounting can be identified. In some examples, auditor-ready evidence of the access review processes can be provided. In this context, least-privilege access controls can be demonstrated to external auditors. Also, remediation of identified issues can be tracked for quarterly compliance reporting, for example. Further, access certification support can be provided. For example, the quarterly access certifications of the enterprise can be pre-filtered to highlight anomalies. This can significantly reduce certification review burden (e.g., by 80-90%) to enable focus on truly anomalous access grants. This also provides context (owner cost center) to reviewers to facilitate informed decisions. Additionally, audit evidence can be generated through an automated, repeatable analysis process that provides a timestamped audit trail of analyses and includes documented methodology and thresholds with evidence of continuous monitoring.

Another example includes security operations. For example, privilege creep can be detected by identifying users who have accumulated access beyond their organizational unit, detecting access retained after organizational transfers, and/or finding legacy access from previous roles. As another example, insider threat indicators can be provided and can include unusual access patterns for a user's organizational position, access to systems outside normal scope of role, and/or a baseline for behavioral anomaly detection. As another example, an access anomaly baseline can be provided to establish normal access patterns per organizational unit, detect deviations from established norms, and/or identify potentially compromised accounts with unusual access.

Another example includes identity governance. This can include, for example, joiner/mover/leaver process validation by verifying access provisioning matches organizational position, detecting incomplete access removal during transfers, and validating access cleanup during offboarding. As another example, access request validation can be provided by checking if requested access aligns with user's organizational unit, comparing against typical access for similar users, and flagging any unusual requests for additional scrutiny. As another example, segregation of duties can be provided by identifying users with access spanning multiple cost centers, detecting potential conflicts of interest, and supporting segregation policy enforcement.

Another example includes improving operational efficiency of the enterprise. This can include, for example, access cleanup prioritization by quantifying a scope of access misalignment, prioritizing remediation by sensitivity or volume, and tracking cleanup progress over time. As another example, policy development can be provided by discovering actual access patterns versus intended policies, identifying gaps between policy and reality, and informing on access policy refinement. Another example, organizational change support, can be provided by identifying access impacts of reorganizations, planning access adjustments for department transfers, and validating access cleanup after restructuring.

As described herein, implementations of the present disclosure provide multiple technical advantages. For example, and relative to traditional approaches, implementations of the present disclosure enable scaling through automated analysis of thousands, tens of thousands, millions, and upwards, of users and hundreds to thousands of groups in minutes, as opposed to weeks or months of traditional approaches. As another example, implementations of the present disclosure, provide consistency through objective, rule-based analysis that is uniformly applied, eliminating reviewer bias and fatigue, and providing repeatable results. Another example includes speed, in which a complete analysis can be executed in minutes, which enables more frequent analysis to be conducted (e.g., monthly, weekly, on-demand). Another example is precision through focus on statistically significant anomalies, reducing false negatives (missed violations), and provides context with each identified anomaly.

Implementations of the present disclosure provided technical improvements over traditional RBAC. For example, implementations of the present disclosure do not require role definition and, instead, discovers patterns from existing access. This obviates the need to define, curate, and maintain an exhaustive role catalog (which requires consumption of technical resources), and automatically adapts to organizational changes. As another example, implementations of the present disclosure provide finer granularity than traditional RBAC by analyzing at the organizational unit level (e.g., individual cost centers), detecting nuanced violations that coarse roles miss, and identifying outliers within roles. As another example, implementations of the present disclosure provide organizational alignment, absent from traditional RBAC, by using actual organizational structure (not IT-defined roles), aligning with how enterprises thinks about access, and leveraging existing organizational data.

Implementations of the present disclosure provided technical improvements over traditional static policy engines. For example, implementations of the present disclosure provide discovery, as opposed to definition, by discovering ownership patterns rather than requiring manual policy authoring, self-updating as membership patterns change, and reducing policy maintenance burden. As another example, implementations of the present disclosure provide threshold-based flexibility through adjustable sensitivity without rewriting policies, accommodating organizational sharing patterns, and balancing detection against false positives. As another example, implementations of the present disclosure provide enterprise context through organizational context (ownership) with each finding, explainable results for non-technical reviewers, and supports audit and compliance reporting.

Implementations of the present disclosure provided technical improvements over access analytics tools. For example, implementations of the present disclosure provide simplicity over access analytics tool by using standard CSV files and Python coding, for example, not requiring specialized IAM tools or databases, and being executable on any appropriate system. As another example, implementations of the present disclosure provide transparency through a clear, auditable algorithm, explainable results, and no "black box" machine learning. As another example, implementations of the present disclosure provide data minimization by working with data exports (no persistent PII storage), being executable offline, and supports data privacy requirements. As another example, implementations of the present disclosure provide cost effectiveness (no licensing fees for specialized tools, running on commodity hardware, using an open source technology stack).

Implementations of the present disclosure further provide a more technically efficient footprint as compared to traditional approaches. For example, implementations of the present disclosure are executable with computing device having 1-2 GB of RAM, minimal storage (e.g., CSV files totaling <100 MB), and single-core processors (CPU).

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for anomaly detection in an identity and access management (IAM) system of an enterprise landscape, comprising:

receiving group data representing a set of groups, each group being associated with an access privilege of a set of access privileges to one or more components of the enterprise landscape;

for each group in the set of groups:

determining a sub-set of users of a set of users associated with the group, users in the set of users each having access privileges to at least one component of the one or more components, for each user in the sub-set of users, determining an attribute value of a set of attribute values for an attribute, for each attribute value in the set of attribute values, determining a percentage of representation within the group to provide a set of percentage representations, and assigning an ownership value to the group based on the set of percentage representations;

outputting a group ownership data structure providing, for each group in the set of groups, a respective ownership value;

processing the group ownership data structure to identify any user in the set of users that has at least one misaligned access privilege relative to the one or more components; and remediating the at least one misaligned access privilege.

2. The computer-implemented method of claim 1, wherein processing the group ownership data structure to identify any user in the set of users that has at least one misaligned access privilege relative to the one or more components comprises:

for a group in the set of groups, for each user associated with the group, comparing a respective attribute value of the user to a respective ownership value of the group to provide a comparison; and selectively determining an access privilege misalignment of the user based on the comparison.

3. The computer-implemented method of claim 2, wherein the access privilege misalignment is determined in response to the respective attribute value of the user being different from the respective ownership value of the group.

4. The computer-implemented method of claim 1, wherein processing the group ownership data structure to identify any user in the set of users that has at least one misaligned access privilege relative to the one or more components comprises excluding at least one group from the set of groups.

5. The computer-implemented method of claim 4, wherein the at least one group is excluded using one of a pattern-based exclusion and an explicit exclusion list.

6. The computer-implemented method of claim 1, wherein at least one group is associated with an ownership value equal to no majority and, in response, is excluded from processing the group ownership data structure to identify any user in the set of users that has at least one misaligned access privilege relative to the one or more components.

7. The computer-implemented method of claim 1, wherein remediating the at least one misaligned access privilege comprises removing an access privilege of a user within the IAM system.

8. A non-transitory computer-readable storage medium coupled to one or more processors and having instructions stored thereon which, when executed by the one or more processors, cause the one or more processors to perform operations for anomaly detection in an identity and access management (IAM) system of an enterprise landscape, the operations comprising:

receiving group data representing a set of groups, each group being associated with an access privilege of a set of access privileges to one or more components of the enterprise landscape;

for each group in the set of groups:

determining a sub-set of users of a set of users associated with the group, users in the set of users each having access privileges to at least one component of the one or more components, for each user in the sub-set of users, determining an attribute value of a set of attribute values for an attribute, for each attribute value in the set of attribute values, determining a percentage of representation within the group to provide a set of percentage representations, and assigning an ownership value to the group based on the set of percentage representations;

outputting a group ownership data structure providing, for each group in the set of groups, a respective ownership value;

processing the group ownership data structure to identify any user in the set of users that has at least one misaligned access privilege relative to the one or more components; and remediating the at least one misaligned access privilege.

9. The non-transitory computer-readable storage medium of claim 8, wherein processing the group ownership data structure to identify any user in the set of users that has at least one misaligned access privilege relative to the one or more components comprises:

for a group in the set of groups, for each user associated with the group, comparing a respective attribute value of the user to a respective ownership value of the group to provide a comparison; and selectively determining an access privilege misalignment of the user based on the comparison.

10. The non-transitory computer-readable storage medium of claim 9, wherein the access privilege misalignment is determined in response to the respective attribute value of the user being different from the respective ownership value of the group.

11. The non-transitory computer-readable storage medium of claim 8, wherein processing the group ownership data structure to identify any user in the set of users that has at least one misaligned access privilege relative to the one or more components comprises excluding at least one group from the set of groups.

12. The non-transitory computer-readable storage medium of claim 11, wherein the at least one group is excluded using one of a pattern-based exclusion and an explicit exclusion list.

13. The non-transitory computer-readable storage medium of claim 8, wherein at least one group is associated with an ownership value equal to no majority and, in response, is excluded from processing the group ownership data structure to identify any user in the set of users that has at least one misaligned access privilege relative to the one or more components.

14. The non-transitory computer-readable storage medium of claim 8, wherein remediating the at least one misaligned access privilege comprises removing an access privilege of a user within the IAM system.

15. A system, comprising:

a computing device; and a computer-readable storage device coupled to the computing device and having instructions stored thereon which, when executed by the computing device, cause the computing device to perform operations for anomaly detection in an identity and access management (IAM) system of an enterprise landscape, the operations comprising:

receiving group data representing a set of groups, each group being associated with an access privilege of a set of access privileges to one or more components of the enterprise landscape;

for each group in the set of groups:

determining a sub-set of users of a set of users associated with the group, users in the set of users each having access privileges to at least one component of the one or more components, for each user in the sub-set of users, determining an attribute value of a set of attribute values for an attribute, for each attribute value in the set of attribute values, determining a percentage of representation within the group to provide a set of percentage representations, and assigning an ownership value to the group based on the set of percentage representations;

outputting a group ownership data structure providing, for each group in the set of groups, a respective ownership value;

processing the group ownership data structure to identify any user in the set of users that has at least one misaligned access privilege relative to the one or more components; and remediating the at least one misaligned access privilege.

16. The system of claim 15, wherein processing the group ownership data structure to identify any user in the set of users that has at least one misaligned access privilege relative to the one or more components comprises:

for a group in the set of groups, for each user associated with the group, comparing a respective attribute value of the user to a respective ownership value of the group to provide a comparison; and selectively determining an access privilege misalignment of the user based on the comparison.

17. The system of claim 16, wherein the access privilege misalignment is determined in response to the respective attribute value of the user being different from the respective ownership value of the group.

18. The system of claim 15, wherein processing the group ownership data structure to identify any user in the set of users that has at least one misaligned access privilege relative to the one or more components comprises excluding at least one group from the set of groups.

19. The system of claim 18, wherein the at least one group is excluded using one of a pattern-based exclusion and an explicit exclusion list.

20. The system of claim 15, wherein at least one group is associated with an ownership value equal to no majority and, in response, is excluded from processing the group ownership data structure to identify any user in the set of users that has at least one misaligned access privilege relative to the one or more components.

* * * * *